(12) United States Patent
Boedec et al.

(10) Patent No.: US 9,379,531 B2
(45) Date of Patent: Jun. 28, 2016

(54) DEVICE FOR JOINING HYBRID ELECTRICAL TRANSMISSION CABLES

(71) Applicant: NEXANS, Paris (FR)

(72) Inventors: Marc Laurent Boedec, Lanester (FR); Abdellatif Ait Amar, Calais (FR)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 14/467,241

(22) Filed: Aug. 25, 2014

(65) Prior Publication Data
US 2015/0075864 A1 Mar. 19, 2015

(30) Foreign Application Priority Data

Sep. 5, 2013 (FR) ...................................... 13 58488

(51) Int. Cl.
H02G 15/00 (2006.01)
H02G 15/02 (2006.01)
H01R 43/04 (2006.01)
H01R 43/00 (2006.01)
H02G 15/076 (2006.01)
H01R 4/02 (2006.01)
H02G 15/18 (2006.01)
(Continued)

(52) U.S. Cl.
CPC .............. *H02G 15/076* (2013.01); *H01R 4/021* (2013.01); *H02G 1/14* (2013.01); *H02G 15/18* (2013.01); *H01R 4/20* (2013.01); *H01R 4/46* (2013.01); *Y10T 29/49195* (2015.01); *Y10T 29/49199* (2015.01)

(58) Field of Classification Search
CPC ............ H01R 4/021; H01R 4/20; H01R 4/46; H01R 9/05; H01R 9/0503; H02G 15/076; H02G 15/18; H02G 1/14

USPC ........... 174/73.1, 75 D; 29/871, 869; 439/523
See application file for complete search history.

(56) References Cited

U.S. PATENT DOCUMENTS 1,793,293 A * 2/1931 Varney .................... F16G 11/02
140/111
2,753,392 A * 7/1956 Hebeler ............... H01R 4/2495
174/84 R
(Continued)

FOREIGN PATENT DOCUMENTS

CN 2906841 5/2007
DE 2931642 2/1981
FR 2243537 4/1975

OTHER PUBLICATIONS

European Search Report dated 2015.

*Primary Examiner* — Timothy Thompson
*Assistant Examiner* — Rhadames J Alonzo Miller
(74) *Attorney, Agent, or Firm* — Sofer & Haroun, LLP

(57) ABSTRACT

A device is provided for connecting two hybrid electrical transmission cables each having stranded first conductive wires made of a first metal in the central zone of the cable and second conductive wires that are made of a second metal of higher hardness than that of the first metal and wound on and outside this central zone, the second conductive wires of the cables being connected by an external conductive sleeve. The central first wires of the cables are connected by a weld made of the first metal and connecting their end, this weld and this end being covered by a tube of metal of hardness equal to or higher than that of the second wires, at least partially in line with the sleeve, the end of the second wires being re-formed on the first wires and on the tube under the external conductive sleeve.

6 Claims, 2 Drawing Sheets

(51) Int. Cl.
*H02G 1/14* (2006.01)
*H01R 4/20* (2006.01)
*H01R 4/46* (2006.01)

(56) References Cited

U.S. PATENT DOCUMENTS

| | | | | |
|---|---|---|---|---|
| 2,867,680 A * | 1/1959 | Stecher | H02G 15/10 | 174/92 |
| 3,296,363 A * | 1/1967 | Laudig | H01R 9/0518 | 174/75 C |
| 3,324,517 A * | 6/1967 | Glowacz | E21B 3/00 | 174/89 |
| 3,384,704 A * | 5/1968 | Vockroth | H01R 4/188 | 174/90 |
| 3,708,611 A * | 1/1973 | Dinger | B29C 61/0616 | 174/84 C |
| 3,787,607 A * | 1/1974 | Schlafly | H02G 15/085 | 156/49 |
| 3,804,972 A * | 4/1974 | Gommans | H01R 9/0503 | 174/88 C |
| 3,859,455 A * | 1/1975 | Gommans | H01R 9/0503 | 174/88 C |
| 3,874,960 A * | 4/1975 | Matsuzaki | H01R 9/0503 | 156/49 |
| 3,921,257 A * | 11/1975 | Appleby | F16G 11/02 | 174/DIG. 12 |
| 4,034,151 A * | 7/1977 | Silva | H02G 15/10 | 174/73.1 |
| 4,096,350 A * | 6/1978 | Mayr | H01R 9/0503 | 174/88 C |
| 4,099,021 A * | 7/1978 | Venezia | H02G 15/10 | 174/73.1 |
| 4,176,244 A * | 11/1979 | Ramy | H02G 15/085 | 174/75 C |
| 4,424,410 A * | 1/1984 | Edgerton | H02G 15/103 | 174/73.1 |
| 4,458,976 A * | 7/1984 | Hudson | H01R 4/46 | 439/785 |
| 4,520,229 A * | 5/1985 | Luzzi | H02G 15/184 | 174/73.1 |
| 4,623,213 A * | 11/1986 | Dotti | H01R 4/021 | 174/90 |
| 4,698,458 A * | 10/1987 | Parmigiani | H02G 15/184 | 174/73.1 |
| 4,742,184 A * | 5/1988 | Courty | H02G 15/103 | 174/73.1 |
| 4,869,683 A * | 9/1989 | Nelson | H01R 13/5213 | 174/138 F |
| 4,894,906 A * | 1/1990 | Huang | H01L 39/02 | 174/94 R |
| 4,935,582 A * | 6/1990 | Calligaris | H02G 15/18 | 174/76 |
| 5,217,387 A * | 6/1993 | Hull | H02G 15/18 | 439/367 |
| 5,217,392 A * | 6/1993 | Hosler, Sr. | H01R 9/0503 | 174/88 C |
| 5,294,752 A * | 3/1994 | Vallauri | H02G 15/18 | 174/73.1 |
| 5,306,176 A * | 4/1994 | Coffey | H01R 13/6392 | 439/367 |
| 5,365,020 A * | 11/1994 | Vallauri | H01R 4/70 | 174/73.1 |
| 5,439,393 A * | 8/1995 | Watson | H01R 13/193 | 439/268 |
| 5,492,740 A * | 2/1996 | Vallauri | B29C 61/065 | 174/73.1 |
| 5,606,149 A * | 2/1997 | Yaworski | H02G 15/103 | 174/84 R |
| 5,821,459 A * | 10/1998 | Cheenne-Astorino | H02G 15/103 | 174/73.1 |
| 6,103,975 A * | 8/2000 | Krabs | H02G 15/103 | 174/74 A |
| 6,250,960 B1 * | 6/2001 | Youtsey | H01R 9/0503 | 439/578 |
| 6,281,442 B1 * | 8/2001 | Guzowski | H02G 15/184 | 174/73.1 |
| 6,454,598 B1 * | 9/2002 | Burwell | H01R 4/726 | 174/84 C |
| 6,520,800 B1 * | 2/2003 | Michelbach | H01R 4/4818 | 439/440 |
| 7,476,114 B1 * | 1/2009 | Contreras | H01R 4/70 | 439/201 |
| 7,728,227 B2 * | 6/2010 | Portas | H02G 15/1826 | 138/103 |
| 7,858,883 B2 * | 12/2010 | Seraj | H01R 4/72 | 174/88 R |
| 8,747,170 B2 * | 6/2014 | Cornelius | H01R 4/36 | 439/798 |
| 2003/0194916 A1 * | 10/2003 | Quesnel | H01R 11/09 | 439/784 |
| 2004/0089463 A1 * | 5/2004 | Nguyen | H01R 9/0503 | 174/21 JC |
| 2004/0229504 A1 * | 11/2004 | Liu | H01R 9/0503 | 439/578 |
| 2008/0073104 A1 * | 3/2008 | Barberree | H01R 9/0524 | 174/93 |
| 2009/0218134 A1 * | 9/2009 | Stroh | H01R 4/021 | 174/74 R |
| 2009/0258547 A1 * | 10/2009 | Hughes | H01R 11/26 | 439/730 |
| 2010/0212936 A1 * | 8/2010 | Arai | H01B 7/285 | 174/23 R |
| 2010/0223785 A1 * | 9/2010 | Hughes | H02G 1/14 | 29/869 |
| 2010/0276196 A1 * | 11/2010 | Seraj | H02G 15/1833 | 174/84 R |
| 2011/0155415 A1 * | 6/2011 | Steinich | H01B 7/282 | 174/93 |
| 2012/0043103 A1 * | 2/2012 | Yin | H02G 15/113 | 174/50 |
| 2012/0085564 A1 * | 4/2012 | D'Angelo, III | E21B 17/003 | 174/13 |
| 2012/0097444 A1 * | 4/2012 | Hilberts | H01R 4/20 | 174/77 R |
| 2012/0305312 A1 * | 12/2012 | McCullough | F16G 11/02 | 174/75 R |
| 2014/0208591 A1 * | 7/2014 | Seraj | H02G 1/14 | 29/857 |
| 2014/0262500 A1 * | 9/2014 | Yaworski | H02G 15/08 | 174/84 R |

\* cited by examiner

DEVICE FOR JOINING HYBRID ELECTRICAL TRANSMISSION CABLES

RELATED APPLICATION

This application claims the benefit of priority from French Patent Application No. FR 13 58488, filed on Sep. 5, 2013, the entirety of which is incorporated by reference.

BACKGROUND

1. Field of the Invention

The invention relates to a device for joining hybrid electrical transmission cables.

As described in patent document CN 2006/20073616, it is known to produce hybrid electrical transmission cables comprising stranded conductive wires made of aluminum in the central zone of the cable and coiled conductive wires made of copper on and outside this central zone.

The invention provides a device for joining such hybrid electrical transmission cables in particular intended for high voltages.

2. Description of the Related Art

Patent document WO 2011/103036 relates to a device for connecting cables comprising a central supporting core made up of composite wires comprising fibers embedded in a matrix that may be made of aluminum, on which core conductive metal wires, which may be made of copper, are wound.

In this device, the central core of the abutted cables is stripped of conductive wires that are removed over a corresponding length and the two abutted cores are connected via a tube equipped with internal sleeves, into which tube their end is inserted and crimped.

As regards connection of the external conductive wires, it is achieved by means of an external metal connector tube that is crimped at its ends onto the conductive wires on each side of the connecting device.

Although such a connecting device may be suitable for cables in which the central core acts as a mechanical support for the external conductive wires, it is unable, in the case of hybrid cables such as described above in which the central aluminum wires have an electrical transmission function, to ensure the electrical withstand of the connection, above all at high voltages.

Objects and Summary

To solve this problem, the invention provides a device for connecting hybrid electrical transmission cables ensuring an optimal electrical withstand, in particular at high voltages.

To do this, the invention provides a connecting device comprising two hybrid electrical transmission cables each comprising stranded first conductive wires made of a first metal in the central zone of the cable and second conductive wires that are made of a second metal of higher hardness than that of said first metal and wound on and outside this central zone, said second conductive wires of said cables being connected by an external conductive sleeve, characterized in that said central first wires of the cables are connected by a weld made of said first metal and connecting their end, this weld and this end being covered by a tube of metal of hardness equal to or higher than that of said second wires, at least partially in line with said sleeve, the end of said second wires being re-formed on said first wires and on said tube under said external conductive sleeve.

Although, according to the preferred embodiment, the first metal is aluminum and the second metal is copper, the connecting device according to the invention is in general particularly suitable for cables each comprising stranded first conductive wires made of a first metal in the central zone of the cable and second conductive wires that are made of a second metal of higher hardness than that of said first metal and wound on and outside this central zone.

Welding the central first wires of the cables ensures a good transmission and that these wires have a good electrical withstand.

The metal tube of higher hardness mechanically protects these first wires made of a metal of hardness lower than that of the second wires and allows the external conductive sleeve that is compressibly crimped on the re-formed second wires or screwed onto the latter to be fitted.

According to a preferred embodiment, said first metal is aluminum, said second metal is copper and said tube is made of steel or hard copper.

Preferably, said second wires at least partially cover said tube.

Said external conductive sleeve may be crimped or screwed.

The invention also relates to a method for producing such a connecting device, characterized in that the end of said first wires is freed by folding back said second wires before said weld is formed and said tube is fitted and in that the end of said second wires is re-formed on said first wires and on said tube before said external conductive sleeve is fitted.

According to a preferred embodiment, said weld is a braze.

This weld may also for example be produced by TIG (tungsten inert gas) welding.

The external conductive sleeve may be crimped or screwed.

BRIEF DESCRIPTION OF THE DRAWINGS

The invention is described in more detail below by way of the figures that show only one preferred embodiment of the invention.

DETAILED DESCRIPTION

Figure 1:
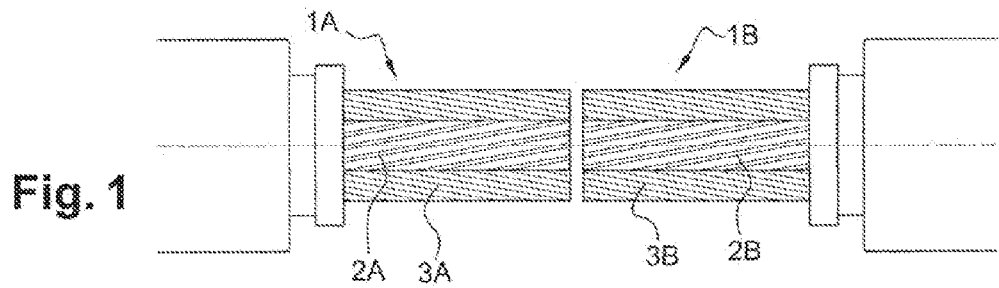
FIGS. 1 to 4 are longitudinal cross-sectional views illustrating the production of a connecting device according to a first embodiment of the invention.

As shown in FIG. 1, two hybrid electrical transmission cables 1A, 1B each comprise stranded first conductive wires 2A, 2B made of a first metal in the central zone of she cable and second conductive wires 3A, 3B that are made of a second metal of higher hardness than that of the first metal and wound on and outside this central zone. They are abutted against each other in order to connect them electrically.

In the preferred application of the invention, said first metal is aluminum and said second metal is copper.

Figure 2:
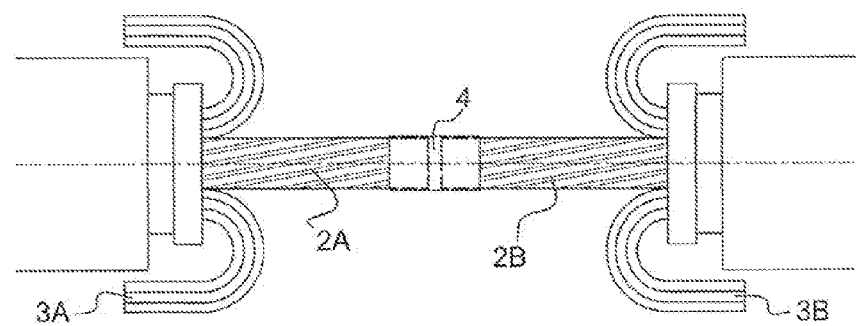

As shown in FIG. 2, the end of the first wires 2A, 2B is freed by unwinding and folding back the second wires 3A, 3B.

The central first wires 2A, 2B of the cables are then connected by an aluminum braze 4 that connects their end. This braze 4 fills the space that exists between the abutted ends of the first wires 2A, 2B while connecting the wires in a particularly effective way as the wires themselves melt over a length of about 10 mm on each side of this filled space.

Figure 3:
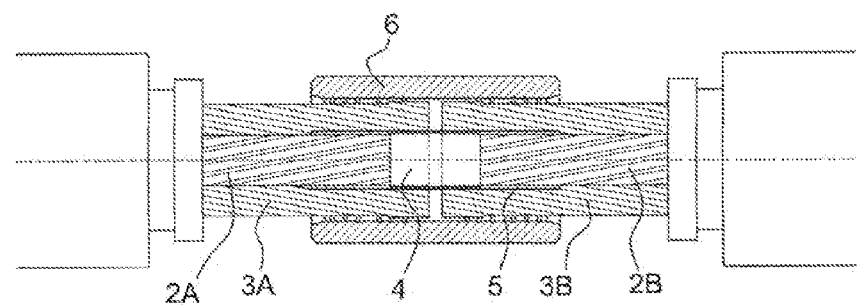

As may be seen in FIG. 3, this braze 4 and these ends are then covered with a tube 5 of metal of hardness equal to or higher than that of the second wires, preferably made of steel or of hard copper, at least in line with a sleeve 6 that is compressibly crimped onto the second conductive wires once the end of the second wires 3A, 3B has been re-formed on the first wires 2A, 2B and on the tube 5, the second wires therefore at least partially covering the tube 5.

Figure 4:
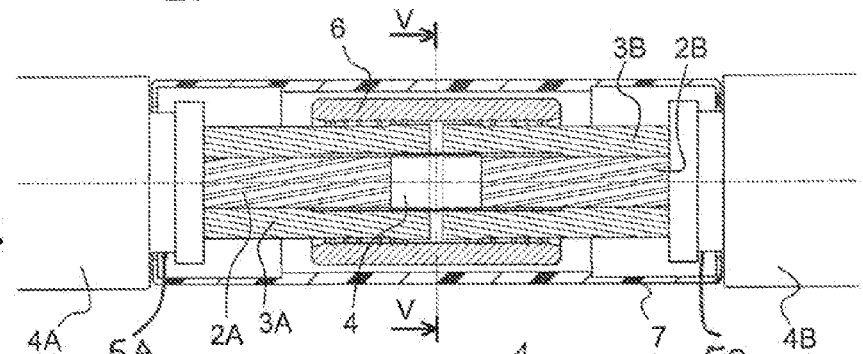
Figure 5:
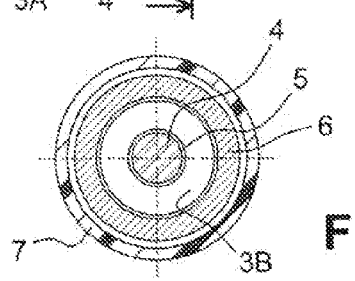
FIG. 5 is a cross-sectional view along V-V in FIG. 4.

Preferably, as illustrated in FIGS. 4 and 5, the connecting device is produced with the end of the two cables 1A, 1B stripped of their insulating cladding 4A, 4B over a relatively limited length. In order to re-form this insulation in line with the connecting device, grooves 5A, 5B are machined at the end of these claddings 4A, 4B and an insulating jacket 7 is fitted by its ends into these grooves 5A, 5B and covers the connecting device.

The tube 5 then consists of two half-cylinders, namely a cylinder cut along two of its generatrices, which half-cylinders are applied around the braze 4 and a portion of the ends of the second wires 3A, 3B.

Likewise, the sleeve 6 also consists of two longitudinal half-cylinders that are crimped onto these second wires 3A, 3B.

Figure 6:
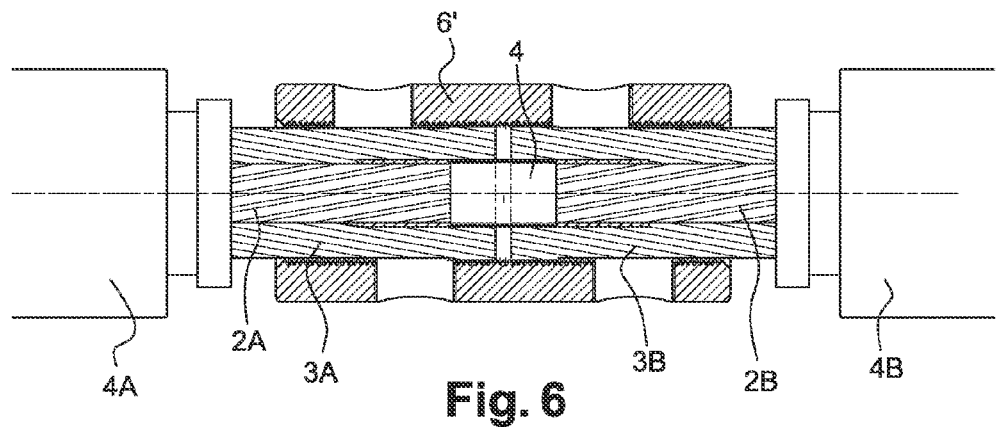
FIGS. 6 and 7 are complete and partial longitudinal, cross-sectional views showing a connecting device according to a second embodiment of the invention.
Figure 7:
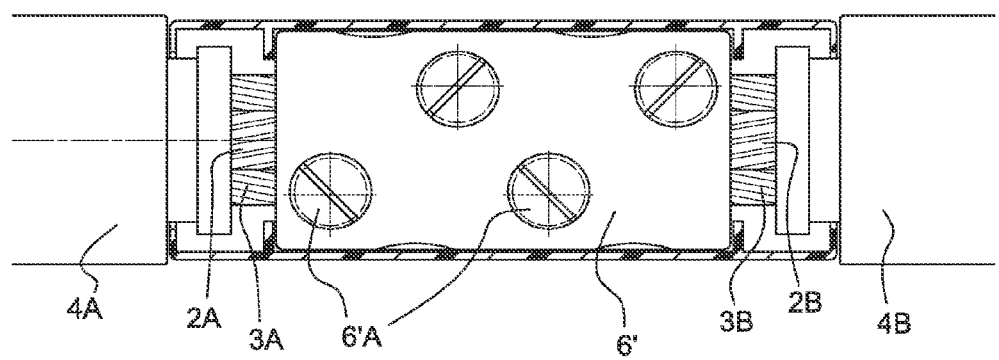

FIGS. 6 and 7 show a connecting device also produced with the same steps as previously, but here comprising an external conductive sleeve 6' employing screws 6'A.

In any case, the two half-cylindrical portions of the external conductive sleeve are screwed together, for example at four points level with the ends, in order to keep them in place before the sleeve assembly is crimped or screwed.

The invention claimed is:
1. Connecting device comprising:
   two hybrid electrical transmission cables each having stranded first conductive wires made of a first metal in the central zone of the cable and second conductive wires that are made of a second metal of higher hardness than that of said first metal and wound on said first conductive wires and outside this central zone,
   said second conductive wires of said cables being connected by an external conductive sleeve,
   wherein said central first wires of the cables are connected by a weld made of said first metal and connecting their end, this weld and this end being covered by a tube of metal of hardness equal to or higher than that of said second wires, at least partially in line with said sleeve, the end of said second wires being re-formed on said first wires and on said tube under said external conductive sleeve, said second wires at least partially covering said tube.

2. Device according to claim 1, wherein said first metal is aluminum, said second metal is copper and said tube is made of steel or hard copper.

3. Connecting device according to claim 1, wherein said external conductive sleeve is crimped or screwed.

4. Method for producing a connecting device according to claim 1, wherein the end of said first wires is freed by folding back said second wires before said weld is formed and said tube is fitted and in that the end of said second wires is re-formed on said first wires and on said tube before said external conductive sleeveis fitted.

5. Method according to claim 4, wherein said weld is a braze.

6. Method according to claim 4, wherein said external conductive sleeve is crimped or screwed.

* * * * *